(No Model.)
J. H. & W. W. EDWARDS.
ATTACHMENT FOR VEHICLE BRAKES.
No. 576,436. Patented Feb. 2, 1897.
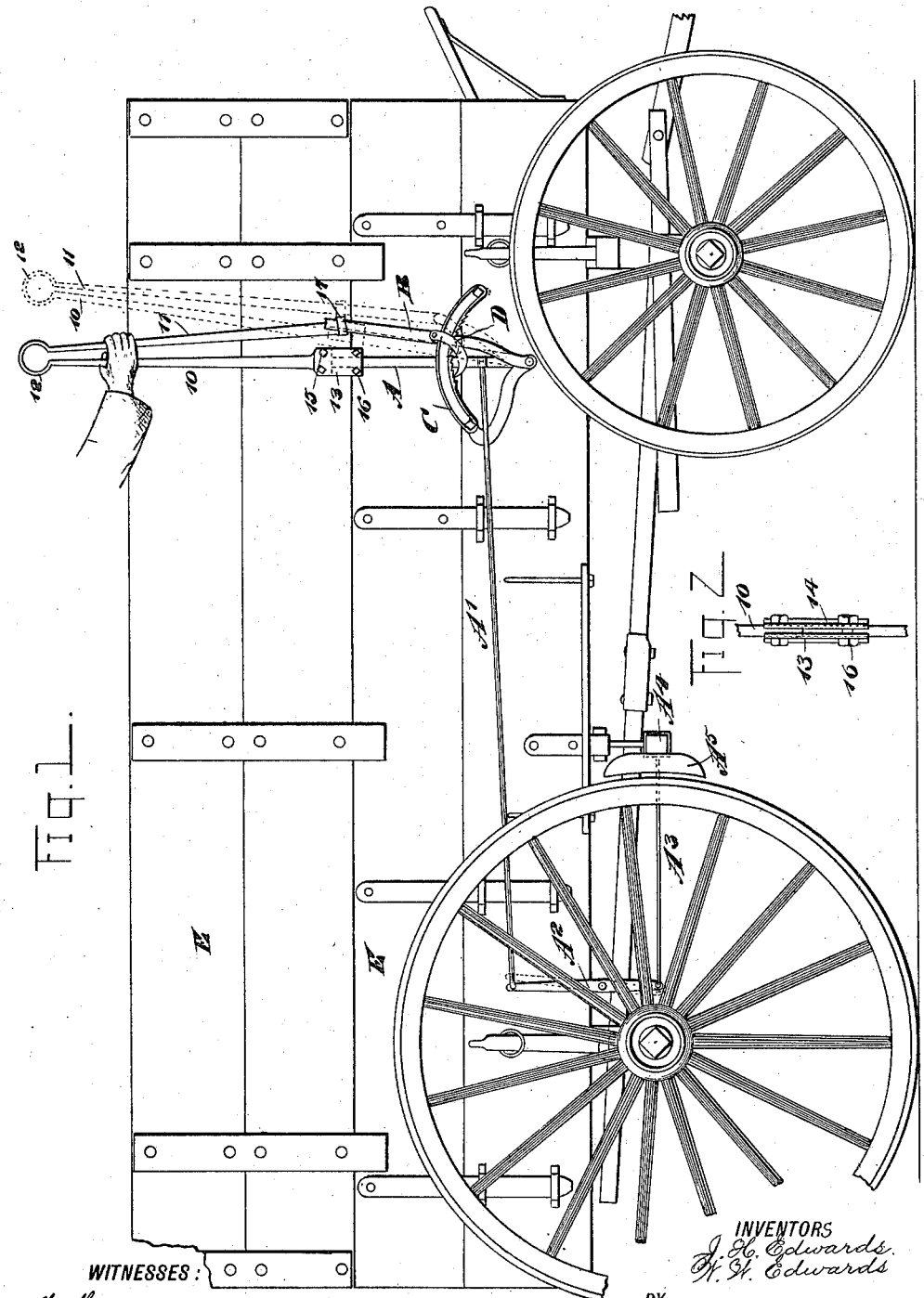
WITNESSES:
INVENTORS
J. H. Edwards
W. W. Edwards
BY
ATTORNEYS.

ated February 2, 1897.

UNITED STATES PATENT OFFICE.

JOSHUA H. EDWARDS AND WILLIE W. EDWARDS, OF STEPHENVILLE, TEXAS.

ATTACHMENT FOR VEHICLE-BRAKES.

SPECIFICATION forming part of Letters Patent No. 576,436, dated February 2, 1897.

Application filed October 28, 1896. Serial No. 610,312. (No model.)

*To all whom it may concern:*

Be it known that we, JOSHUA H. EDWARDS and WILLIE W. EDWARDS, of Stephenville, in the county of Erath and State of Texas, have invented a new and Improved Attachment for Vehicle-Brakes, of which the following is a full, clear, and exact description.

The object of our invention is to provide an extension-handle for the manipulating-levers of vehicle-brakes, being particularly applicable to the brake-levers which are placed upon the bodies of vehicles to which extra side-boards are attached for the purpose, for example, of conveying cotton from a field to a gin, the extension-handle being so attached to the brake-levers that the said brake-levers may be operated as conveniently and as positively from a point far above the main body of the wagon as when the operator is stationed in the said body.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both the figures.

Figure 1 is a side view of a wagon and a side elevation of the extension-handle applied to the levers of the brake, and Fig. 2 is a detail view illustrating the manner in which the extension-handle may be secured to the back brake-lever.

In carrying out the invention the brake and the mechanism controlling the brake are of the ordinary construction and form no portion of the invention. The brake-operating mechanism shown consists of a back lever A, a front lever B, a rack C, and a dog D, connected with the front lever and arranged for engagement with the rack, a connecting-rod A', attached to the back lever and likewise connected with a shifting lever A², which has a link connection A³ with the brake-beam A⁴, carrying the brake-shoes A⁵.

The extension-handle for the brake comprises two members 10 and 11, connected at the top by an arch 12, preferably of a spring character. The rear member 10 of the extension-handle is provided with plates 13 and 14, which are preferably attached to opposite sides of the lower end of the said member by bolts 15, and bolts 16 are passed through the two plates 13 and 14 at the bottom, one near each side, while at the lower end of the forward member 11 of the extension-handle a loop 17 is formed, the said loop being in the nature of a strap attached to the bottom portion of the aforesaid member 11 of the handle.

When side-boards E are placed upon the body of the wagon and the load is up to or near the level of the top of the said side-boards, it is impossible for a driver or a person seated on the load to reach the brake-levers A and B under the ordinary arrangement. Consequently the brakes are comparatively useless, and many runaways are the result, by reason of the wagon running on the team in descending an incline. To prevent such a disaster, and in order to have the brakes under complete control, the extension-handle is provided, which handle may be quickly and conveniently secured to the ordinary brake-levers or removed therefrom. The back brake-lever A is passed into the socket formed by the plates 13 and 14, between the bottom bolts 16. The bottom bolts are then tightened, securing the member 10 of the extension-handle firmly to the back lever A, while the front lever B is loosely entered into the loop or strap 17 on the forward member of the extension-handle, permitting the brake-levers to be manipulated as readily from the top of a load of hay or a load of cotton as if the operator were in the main body of the vehicle.

Having thus described our invention, we claim as new and desire to secure by Letters Patent—

1. A device for operating the levers of vehicle-brakes, consisting of two connected members, each member terminating in a socket, one socket being adapted to receive the back lever and the other socket the front lever of the brake, as and for the purpose specified.

2. A handle attachment for the levers of vehicle-brakes, the said attachment consisting of two connected members arranged one alongside of the other, one member being provided with a socket and fastening devices, the socket being adapted to receive the back lever of the brake, the other member of the handle having a loop formed thereon of such dimensions as to loosely receive the front lever of the brake, as and for the purpose specified.

3. A handle for vehicle-brake levers, consisting of two substantially parallel members having a flexible connection at the top, one of the members terminating in a socket provided with clamping devices, the said socket being adapted to receive a brake-lever connected with the brake-shoes, and the other member of the attachment terminating in a loop adapted to receive the lever of the brake operating the locking device, the said loop being of such dimensions as to fit loosely on the lock-lever of the brake, as and for the purpose specified.

4. In a vehicle-brake, the combination, with the lever connected with the brake-shoes and the lever carrying the locking device for the brake, of an extension-handle comprising two members connected at the top, one member terminating in a socket provided with clamping devices, the said socket being arranged to receive the brake-lever connected with the brake-shoes, the other member of the extension-handle terminating in a loop which loosely receives the upper portion of the brake-lever carrying the locking device for the brake, as and for the purpose specified.

JOSHUA H. EDWARDS.
WILLIE W. EDWARDS.

Witnesses:
JAMES W. FERGUSON,
WILLIAM A. DAWSON.